United States Patent
Punsly et al.

(12)

(10) Patent No.: US 6,270,616 B1
(45) Date of Patent: *Aug. 7, 2001

(54) METAL-FILLED, PLATEABLE STRUCTURAL ADHESIVES FOR CYANATE ESTER COMPOSITES

(75) Inventors: Brian M. Punsly, Torrance; Andre Wallace, Moreno Valley; William E. Elias, Manhattan Beach, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/109,011

(22) Filed: Jul. 1, 1998

Related U.S. Application Data

(63) Continuation-in-part of application No. 08/549,141, filed on Oct. 27, 1995, now abandoned.

(51) Int. Cl.[7] .................................. C09J 5/00; C09J 9/02; C08L 63/02
(52) U.S. Cl. ........................... 156/330; 523/458; 428/414
(58) Field of Search ........................... 156/330; 523/458; 428/414

(56) References Cited

U.S. PATENT DOCUMENTS

| | | | |
|---|---|---|---|
| 4,695,508 | * 9/1987 | Kageyama et al. | 156/330 |
| 5,780,581 | * 7/1998 | Hermansen et al. | 528/363 |
| 5,840,829 | * 11/1998 | Hermansen et al. | 528/363 |
| 6,114,450 | * 9/2000 | Sachdev et al. | 625/118 |

* cited by examiner

Primary Examiner—Donald R. Wilson
(74) Attorney, Agent, or Firm—T. Gudmestad

(57) ABSTRACT

A family of adhesives is provided for bonding cyanate ester composite articles together which is also plateable with metal once chemically etched. The adhesives comprise a polymeric matrix and a filler of metal powder or metal flakes. The polymeric matrix comprises at least one polyepoxide resin and at least one curing agent. In practice, the present adhesive is applied to the surface of cyanate ester composite articles to be bonded and is allowed to cure in air at a temperature less than 125° C. Thereafter, the surface of the assembly is chemically etched and then plated with metal. The present adhesives enable the complete coverage of the cyanate ester composite assembly with the plated metal, including the adhesive bondlines. A cyanate ester resin structure assembled with the present adhesive composition may, upon plating, replace certain metallic components in such applications as aircraft, spacecraft, and automobiles given its highly conductive and comprehensive metallic coating.

13 Claims, No Drawings

METAL-FILLED, PLATEABLE STRUCTURAL ADHESIVES FOR CYANATE ESTER COMPOSITES

CROSS-REFERENCE TO RELATED APPLICATIONS

The present application is a continuation-in-part of application Ser. No. 08/549,141, filed Oct. 27, 1995, now abandoned. The present application is also related to application Ser. No. 08/339,380, filed Nov. 14, 1994, now abandoned, and application Ser. No. 08/549,139, filed on Oct. 27, 1995, now U.S. Pat. No. 5,780,581. The former is directed to a method for preparing the surface of cyanate ester polymer composites for subsequent plating with metal. The method of preparation includes a step of contacting the surface with a preheated solution comprising a quaternary ammonium hydroxide or a primary amine. The latter is directed to an epoxy-based adhesive filled with cyanate ester polymer in powder form for bonding cyanate ester composites, with both the cyanate ester composites and the epoxy-based adhesive being plateable with strong metal adhesion upon treatment by a surface etching process such as that recited in the above-referenced application Ser. No. 08/339,380.

BACKGROUND OF THE INVENTION

1. Field of the Invention

The present invention is directed to bonding cyanate ester composites to one another, and more particularly, to an adhesive that bonds cyanate ester composites while also being plateable with strong metal adhesion upon treatment by a surface etching process.

2. Description of Related Art

Metals are commonly employed in manufacturing because they offer high degrees of ductility and strength as well as high conductivity. However, metals are generally heavier than other common materials like plastics and non-metallic composites, such that the positive characteristics attributable to metals often come at the cost of increased product weight. Increased product weight is particularly a concern in industries manufacturing vehicles of transport such as automobiles, aircraft, and spacecraft, as well as payloads of such vehicles, given that increased weight adversely affects fuel economy. Moreover, metals typically have a higher coefficient of thermal expansion than non-metallic composites, such that metals exhibit more dimensional change given temperature differentials.

Accordingly, these industries have increasingly incorporated non-metallic, lighter-weight materials such as plastics into automobiles and aircraft in an effort to economize fuel and maintain dimensional stability. However, plastics are not universally suitable as substitutes for metals. For example, while plastics offer high degrees of ductility and strength, plastics are relatively nonconductive materials. Thus, plastics cannot supplant metals used as electrical, thermal, or microwave conductors.

It is therefore desirable to plate a metal coating onto plastic, thereby simultaneously realizing the benefits of both metals and plastics. More specifically, metal plating on plastic materials allows the use of these lighter-weight plastic materials for the bulk of components and minimizes the amount of metal required to achieve a highly conductive surface. Of particular interest is metal plating on cyanate ester polymer composites of cyanate ester resin and graphite fiber, since such composites have certain unique advantages that make them very useful for specific applications, such as applications in communications spacecraft. Specifically, cyanate ester polymer composites can be formulated in ways that make them very resistant to even minute dimensional changes that would otherwise occur as a result of temperature changes or the absorption and desorption of moisture in the presence of air.

Two methods have been developed by which a cyanate ester composite surface may be treated in preparation for the subsequent plating of metal, both of which are the subjects of previously-filed applications assigned to the same assignee as the present application. An application entitled "Preparation of Cured Cyanate Ester Resins and Composites for Metal Plating" (Ser. No. 08/339,390, filed Nov. 14, 1994 U.S. Pat. No. 5,569,493), recites treating the surface of cyanate esters polymers and composites with a preheated solution of an alkali metal salt of an alkoxide to achieve greater adhesion between the surface and subsequently-plated metals. A second application filed on even date therewith and entitled "Preparation of Cyanate Ester Polymers and Composites for Metal Plating" (Ser. No. 08/339,380) recites treating the surface with a preheated solution comprising a quaternary ammonium hydroxide or a primary amine.

The above-described surface treatment methods achieve greater adhesion for cyanate ester polymer composites by chemically etching the composite surfaces. Chemical etching texturizes the composite surfaces, thereby providing mechanical anchoring sites for the plating of metal such that the metal adheres to the composite. Scanning electron micrographs have revealed that surface texturing derives from microcracking in the cyanate ester resin that is wedged between the stiff graphite fibers of the composite.

Adhesion between cyanate ester composites and subsequently-plated metals is further improved by practicing the invention described in an application entitled "Cyanate Ester Films that Promote Plating Adhesion to Cyanate Ester Graphite Composites" (Ser. No. 08/507,178, filed on Jul. 26, 1995, now abandoned). That application recites improving the adhesion between cyanate ester composites and a subsequently-plated metal by applying a film of cyanate ester resin to the composite surface prior to surface etching. The cyanate ester resin film provides a homogenous surface upon which to obtain uniformity of adhesion between the cyanate ester resin composite and a subsequently-plated metal. In the absence of a cyanate ester resin layer, the inconsistent distribution of graphite (or other composite-forming material) across the surface of the cyanate ester resin composite leads to variability in adhesiveness with a subsequently-plated metal.

While the above-described surface treatment methods provide the necessary surface texturing for subsequently plating a metal onto the treated composite surface, the structural adhesives presently available to bond cyanate ester composite articles together are not satisfactorily plated with metal upon completion of these same surface treatment methods. Articles made of cyanate ester composites are often pieced together to form complicated structures, since it would be impractical both technically and economically to fabricate complicated structures as a single piece. Since presently-available structural adhesives fail to satisfactorily plate by the same processes used to prepare their cyanate ester composite adherends, structures assembled from cyanate ester composite articles are not comprehensively plated with metal. More specifically, there are delineations in the metal plating at the exposed bondlines. Discontinuities in the plating of composite structures preclude their use in certain sensitive applications, such as satellite microwave circuitry.

Presently, structural adhesives available to bond cyanate ester composite articles together include cyanate ester adhesives and epoxy-based adhesives. While certain commercially-available cyanate ester adhesives may be successfully prepared for metal plating by the above-described surface etching processes, these adhesives require cure temperatures exceeding 120° C., at which articles made of graphite fiber reinforced cyanate ester composites warp. In contrast, while certain commercially-available epoxy-based adhesives cure at room temperature to bond cyanate ester composites without warpage, these adhesives either plate poorly following the above-described surface etching treatments or, upon plating, exhibit unacceptably low lap shear and peel strengths. For example, aluminum-filled epoxy adhesives (such as Ciba Geigy's RP4036 adhesive including RP1500 hardener) fail to plate properly following treatment by the above-described etching processes without an additional special activation step. Commercially-available silver-filled epoxy adhesives contain large amounts of silver filler to achieve electrical conductivity; as a result, metal subsequently plated onto these adhesives (following surface etching) suffers from poor lap shear and peel strengths because of the large amount of filler material.

Thus, a need remains for an adhesive that develops strong bond joints to cyanate ester composites while also being capable of developing strong adhesion to a subsequently-plated metal given surface texturing treatments that are performed simultaneously on the adhesive and its composite adherends. The adhesive must be easy to apply and readily curable at temperatures low enough such that the adherend cyanate ester composite parts are not warped. Finally, the adhesion achieved between the exposed bondline of the adhesive and the subsequently-plated metal must be uniform and reproducible, since a single plating failure in an application such as a satellite microwave circuit can be economically catastrophic. In particular, in order to be suitable for the above-described demanding applications, the plating adhesion value should be 5 as measured per ASTM D3359 simultaneously with the plating to a cyanate ester composite substrate, the distribution of peel strength should have a mean, or average, value that is greater than two standard deviations above 1.5 lbs/inch-width, and the distribution of lap shear should have a mean value that is greater than two standard deviations above 2,000 psi.

SUMMARY OF THE INVENTION

In accordance with the invention, an adhesive is provided such that, when bonding cyanate ester composite articles together, both the composite articles and the adhesive bondline are similarly plateable with metal following simultaneous surface texturing. The adhesive of the invention comprises a polymer mixture and a filler, with the polymer mixture comprising at least one polyepoxide resin and a substantially stoichiometric amount of curing agent and the filler comprising metal that is acid-activated. The minimum amount of metal filler present in the adhesive is that sufficient to provide a plating adhesion value of 5 as measured per ASTM D3359 simultaneously with plating to a cyanate ester composite substrate. The maximum amount of metal filler present is dictated by the value of peel strength; that is, the distribution of peel strength should have a mean greater than two standard deviations above 1.5 lbs/inch-width, as measured per ASTM D1876. If the distribution of peel strength is less than this value, then the maximum amount of metal filler is exceeded. In addition, the distribution of lap shear should have a mean greater than two standard deviations above 2,000 psi, as measured per ASTM D1002.

In practice, the adhesive of the invention is formulated by mixing the polymer mixture components with metal (in powder or flake form) to form a thoroughly wetted mass. The resulting adhesive can be formulated to have a consistency ranging from a thin syrup to a flowable paste and is curable at room temperature. To employ the adhesive in the practice of the invention, one simply applies the adhesive to the surface of at least one of the cyanate ester composite articles to be joined and then secures the articles as a mated assembly with the adhesive therebetween and in contact with the articles to bonded. The adhesive then cures at room temperature, thereby bonding the cyanate ester composite articles to one another without exposing the articles to elevated temperatures and the risk of warpage.

The adhesive of the invention may be plated with metal to the same extent possible with cyanate ester polymer composites. More particularly, once the cyanate ester polymer composites are bonded with the present adhesive, the entire assembly may then be etched using a surface texturing technique and subsequently plated with metal. The exposed bondlines of the present adhesives are etched and plated along with the cyanate ester composite articles.

Accordingly, the adhesives of the invention allow industry to securely bond together cyanate ester composite articles such that the exposed bondlines likewise are successfully plated with metal. As such, complex structures boasting the light weight and dimensional stability of cured cyanate ester polymer composites may be assembled from separate articles made of cured cyanate ester resin composites and thereafter etched and plated as a whole. Thus, the assembled cyanate ester composite structures exhibit complete coverage by the plated metal without undesirable delineation by unplated bondlines.

The adhesive and methods of the present invention are expected to have a positive economic impact on the automotive, aircraft, and spacecraft industries. By enabling industry to confidently assemble cyanate ester composite articles into wholly plateable structures, industry need not manufacture complex structures as a single piece, which would be technically and economically challenging if not impossible. Thus, the adhesive of the invention enables the replacement of complex metal structures with lighter-weight, dimensionally-stable assembles made of cured cyanate ester resin composite articles, thereby reducing total product weight and achieving greater fuel efficiency in vehicles of transport.

DETAILED DESCRIPTION OF THE PREFERRED EMBODIMENTS

The adhesive of the present invention develops strong bond joints between cyanate ester composites and is also plateable with strong metal adhesion when etched along with its cyanate ester adherends. Moreover, the adhesive is curable at room temperature so that the cyanate ester composite adherends are not warped by an elevated cure temperature, and the adhesive is rigid and dimensionally stable. The adhesive comprises a polymeric matrix and a metal filler, as described in greater detail below. All told, the present adhesives enable industry to assembly cyanate ester composite parts into complex structures having unobtrusive, plated bondlines.

The adhesives of the present invention are specifically designed to bond cyanate ester resin composites together, with the composites comprising a cyanate ester resin and a fiber such as graphite or fiberglass. Examples of commercially-available cyanate ester resins that form part of composites benefited in the practice of the invention include, but are not limited to, cyanate ester resin RS12 available from YLA, cyanate ester resins BTCY-1 and EX-1515 available from Bryte, and cyanate ester resin 954-2A available from Fiberite. Examples of commercially-available graphite fibers that form part of cyanate ester resin composites benefited in the practice of the invention include, but are not limited to, XN-80 carbon fibers available from Nippon Granoc, K13B from Mitsubishi, and M55J from Toray. Further, rather than graphite or fiberglass, the composite may comprise Kevlar™ fibers, which are aromatic polyamide fibers that are commercially available from DuPont.

The composition of the present adhesive is based on the use of a combination of selected polyepoxide resins, curing agents, and fillers which will provide a room-temperature curable product that provides strong bonds between cyanate ester composite materials while being plateable with metal following surface texturing. The selection of each of these components is critical in obtaining an adhesive with the desired properties. The purity of the components employed in the practice of the invention is that employed in normal commercial practice.

The polymeric matrix of the present adhesives is composed of at least one polyepoxide resin and at least one curing agent. The polyepoxide resins suitably employed in the practice of the invention preferably have a viscosity not exceeding 30,000 cP at room temperature yet are classified as "rigid" epoxy resins. Rigid epoxy resins are defined as epoxy resins having a Shore D measurement exceeding about 75 when cured with diethylene triamine ("DETA"). However, the adhesives of the invention are not so limited and may employ flexible epoxy resins having Shore D measurements of less than 75 when cured with DETA, depending upon the particular application.

Suitable polyepoxide resins must be capable of being etched in a surface texturing process. More particularly, mechanical anchoring sites for the subsequent plating of metal on the adhesive are created in surface etching processes given a differential etching rate among the components of the adhesive. Thus, polyepoxide resins are required that may be etched upon cure, but not at the same rate as the metal filler. Furthermore, the filler must be easily activated by an acid such as employed in precursor steps to electroless plating.

Examples of classes of polyepoxide resins suitably employed in the practice of the invention include diglycidyl ether of Bisphenol A, diglycidyl ether of Bisphenol F, and EPON resin-toughened epoxies. Preferably, at least one of the following three formulations is employed in the practice of the invention: (1) diglycidyl ether of Bisphenol A, which has an epoxy equivalent weight ranging from about 185 to 192 and is commercially available from the Shell Chemical Company, Houston, Tex., under the trade designation EPON 828; (2) a mixture comprising 11% butyl glycidyl ether and 89% diglycidyl ether of Bisphenol A, which has an epoxy equivalent weight ranging from about 175 to 195, and is commercially available from the Shell Chemical Company under the trade designation of EPON 815; and (3) Heloxy 58005, which is commercially available from Shell Chemical Company and comprises 60% EPON 828 and 40% HY-CAR 1300×13, which is a carboxyl-terminated butadiene-acrylonitrile elastomer available able from B. F. Goodrich. Each of these polyepoxide resins is etched in surface texturing processes described below, but not at the same rate as a metal such as copper. A mixture of suitably employed polyepoxide resins may be employed in the practice of the invention.

The curing agents suitably employed in the present invention are chosen to render a cure at room temperature with the selected polyepoxide resins. The primary curing agent component is selected from the class of aliphatic polyamines, which effect cures of the selected polyepoxide resins at room temperature. Examples of suitably-employed aliphatic polyamines include triethylenetetramine, which is commercially available from E. V. Roberts under the trade designation TETA, and tetraethylenepentamine, which is commercially available from E. V. Roberts under the trade designation TEPA. The primary curing agent may be represented by a single aliphatic polyamine or by a combination of aliphatic polyamines. In the practice of the invention, the primary curing agent preferably provides at least 60% of the active hydrogen atoms available in the curing agent component as a whole. In addition to a primary curing agent of aliphatic polyamine(s), secondary curing agents may be employed in the practice of the invention. The secondary curing agents may be selected from the following four groups, which are not entirely mutually exclusive: (1) catalytic curing agents such as tris(dimethyl-amino) methyl phenol, which is commercially available from Air Products under the trade designation Ancamine K54; (2) cycloaliphatic diamines such as bis (para-aminocyclohexyl) methane, which is commercially available from Pacific Anchor under the trade designation PACM; (3) aromatic amines such as meta-phenylenediamine and aniline; and (4) anhydrides, such as hexahydrophthalic anhydride. In the practice of the invention, the primary curing agent TEPA is preferably employed in conjunction with a secondary curative such as PACM or Ancamine K54. The preferred ratio by weight of TEPA:PACM is about 1:1.2, while the preferred ratio of TEPA:Ancamine K54 is about 5.3+:1.

The total amount of curing agent is preferably in stoichiometric proportion relative to the polyepoxide resin(s) employed. In general, the amount of curing agent may be varied about ±15 percent from stoichiometry, with little adverse effect on the final adhesive product. The severity of adverse effects deriving from employing more or less than the exact stoichiometric amount of curing agent depends upon the functionality of the ingredients employed (e.g., trifunctional epoxy resins fare better than difunctional epoxy resins).

The filler component of the present adhesive composition comprises a metal in the form of a powder or flakes. The metal should be one that may be activated by an acid (such as employed as a typical precursor to electroless plating) to accept the deposition of a subsequently-plated metal. While any such metal may be employed as a filler in the practice of the invention, copper, tin, brass, bronze, silver, and gold are preferred primary metals and may be employed alone or in any combination. Copper is most preferred because it is both very effective and relatively inexpensive.

Additionally, a secondary metal may be incorporated into the filler component. For example, nickel and/or aluminum may be optionally employed as a secondary metal. Nickel cannot be used as a primary metal for the filler since it does not etch well with known etching techniques for cyanate ester composites, such as the below-described primary amine bath (see coupon nos. 13–20 below in Table II of the Examples). In contrast, a combination of nickel and copper filler can be used to make an adhesive which can be plated, stripped in nitric acid, then re-plated, providing more margin for error. Aluminum cannot be used as a primary metal because, although it may be etched by a primary amine bath, it does not accept an electroless copper deposit without a special activation. Thus, one can get surface texturing but no chemical bonding of the copper plate to the aluminum filler, resulting in a coarse surface that is undesirable for plating due to the increase of ohmic losses in the plating. Thus, while nickel and aluminum should not be used alone in the practice of the invention, they may be combined with any of the above-described primary metals.

The metal filler serves to provide mechanical anchoring sites for a subsequently-plated metal. More particularly, chemical etching processes used to prepare cyanate ester polymer composites and the present structural adhesives for plating actually texturize the surface of the composites and the exposed bondlines of the adhesives such that there are mechanical anchoring sites for the plating of metal. To texturize cyanate ester composites, the cyanate ester polymer is etched away faster than the fiber reinforcements, thereby creating the desired texture by providing mechanical anchoring sites. To texturize the present adhesives, the metal filler is etched away faster than the polymeric matrix to likewise provide mechanical anchoring sites. If copper is employed as the filler metal component as a prelude to copper plating, the copper granules in the adhesive can also metallically bond to subsequently-plated copper, even further increasing the strength of the plating adhesion to the present structural adhesives. This is why the copper filler produces the best plating adhesion.

The filler may be employed having a particle size up to about 100 $\mu$m. However, if the surface irregularities created by etching are too coarse, the plating will appear coarse, which is an undesirable characteristic. Therefore, it has been determined experimentally that surface texture and resulting adhesion are optimized by preferably employing filler particle sizes ranging from about 1 to 10 $\mu$m. More preferably, the filler particles have particle sizes ranging from about 1 to 5 $\mu$m. By employing a metal filler having an average particle size in this range with a relatively narrow particle size distribution, a smoother plated surface is obtained following surface texturing treatment.

The filler may be employed in the form of a powder or flakes. With regard to powder, the above-described particle size dimensions refer to the diameter of the nominally spheroidal powder particles. In contrast, with regard to a filler in flake form, the dimensions refer to an effective dimension as measured per ASTM B330. A filler comprising flakes is preferable to a powder filler, since flakes provide a smoother surface than powder and render 32 RMS plating finishes achievable.

Employing a filler capable of particle sizes as low as 1 to 5 $\mu$m with the appropriate resins renders the present adhesives "wickable". Wickable adhesives are capable of flowing through thin cracks to reach areas that would otherwise be inaccessible to adhesives having larger filler particle sizes. This represents an advantage over the adhesive recited in the above-mentioned related application "Plateable Structural Adhesives for Cyanate Ester Composites", application Ser. No. 08/549,139, filed on Oct. 27, 1995. The adhesives of that application employ a cyanate ester polymer filler instead of a metal filler. Since it is not economically feasible to produce a cyanate ester powder having particle sizes ranging from 1 to 5 $\mu$m, the adhesives of that application cannot provide the wicking capabilities of the present adhesives.

The filler component should represent at least about 5 vol % of the adhesive composition but should not exceed about 35 vol %. If insufficient metal filler is employed, too few mechanical anchoring sites will be created with surface texturing processes and there will be poor adhesion with a subsequently-plated metal. On the other hand, if an excessive amount of metal filler is employed, there will be insufficient polymeric matrix to provide a strong bond between cyanate ester composite articles. Moreover, an excessive amount of metal filler will render the adhesive brittle and will decrease its lap shear and peel strengths. At any rate, the amount of filler should be greater than that level at which the plating adhesion value is 5 as measured per ASTM D3359, modified as described below, simultaneously with plating to a cyanate ester composite substrate and should be less than that level at which the adhesive has a distribution of peel strength with a mean, or average, that is less than two standard deviations above 1.5 lbs/in.-width as measured per ASTM D1876.

In particular, plating adhesion values of 5 are obtained with the adhesive of the present invention even as measured per a modified version of ASTM D3359. The unmodified version employs a pressure sensitive tape with an adhesion of 40 to 45 oz/in.-width, whereas the modified version employs a more difficult standard of 150 oz./in.-width.

Other optional components for the present adhesive composition include ceramic powders to lower the coefficient of thermal expansion and cyanate ester powders to increase the plating adhesion of surfaces cured against steel. Fumed silica (such as commercially available under the trade designation Cabosil) and an epoxy silane (such as $\gamma$-glycidoxy propyl trimethoxy silane commercially available from Union Carbide under the trade designation Silane A-187) may also be added. The fumed silica acts as a thickener, while the silane helps to wet the surface of the composite for better adhesion. Other optional additives to the adhesive composition include UV stabilizers, antioxidants, and various other processing aids such as wetting agents, antifoaming agents, an dispersing agents, all of which are known and commonly used in the art. The processing aids are preferably employed at a concentration of less than about 5 wt % of the total adhesive composition. Additives cannot be added indiscriminately, as the platability is sensitive to surface chemistry.

The adhesive of the present invention is formulated by mixing the liquid polyepoxide resin with the dry ingredients, namely the curing agent and the filler component, in their appropriate concentrations until the dry ingredients are thoroughly wetted. Preferably, the dry ingredients are milled into the polyepoxide resin component, for example, using a 3-roll mill. Milling achieves a good blend of resin and curative so that the resulting adhesive is uniform in composition and therefore exhibits higher overall quality. Once the dry ingredients are thoroughly wetted, air is removed from the adhesive mixture by further mixing it under vacuum. The resulting composition has a consistency ranging from a thin syrup to a flowable paste. The present adhesives may either be used promptly upon formulation or, the more likely scenario, are frozen to extend their storage life for several weeks. If frozen, the present adhesives may be thawed as needed.

In practice, the present adhesives are applied to at least one of the surfaces of the cyanate ester composite articles to be bonded together. Application may be accomplished with a brush or spatula or any tool capable of spreading the paste-like consistency of the adhesives, or a syringe for more flowable adhesives. The adhesives are preferably applied to a thickness of at least about 0.002 to 0.010 inch. Once the adhesive has been applied, the cyanate ester composite articles to be bonded are pressed together in a mated assembly with the adhesive therebetween. The mated assembly is then preferably clamped in place to avoid any relational movement between the assembled articles until the adhesive has cured, which typically occurs within 24 hours at room temperature, or within a temperature within the range of about 70° and 110° C. Importantly, the bond joint should be exposed to air during the cure cycle. Upon cure, the present adhesive composition forms a strong, rigid bond between the cyanate ester composite articles. In any event, the adhesive is cured in air at a temperature less than 125° C. to avoid exposure of the cyanate ester composite articles to temperatures above 125° C., which would tend to warp them. All other parameters, such as humidity, are at ambient conditions.

The manner in which a cure of cyanate ester composite articles is achieved prior to application of the present adhesive and bonding forms no part of this invention, with a typical curing process being conducted in an autoclave at a temperature ranging from about 250° to 350° C. The length of time required to achieve a cure depends entirely upon the specific cyanate ester composite being cured, while the length of time required to ramp to the cure temperature depends upon the thermal mass and emissivity of the part. Notably, the cyanate ester composite articles may be further prepared for plating by depositing on the surface thereupon a layer consisting essentially of cyanate ester resin prior to curing, bonding, and etching. This procedure is recited in an application assigned to the present assignee and entitled "Cyanate Ester Films that Promote Plating Adhesion to Cyanate Ester Graphite Composites" (Ser. No. 08/507,178, filed on Jul. 26, 1995). Once a layer of uncured cyanate ester is in place, the composite and its resin layer are simultaneously subjected to the curing process, which securely fuses the composite and its resin layer together. Preferably, a cyanate ester resin film having a thickness of about 0.001 inch is applied to the composite surface to achieve a film of resin having a thickness of about 1 to 2 $\mu$m on the surface, since much of the cyanate ester resin from the film diffuses into the laminate during curing.

Once the adhesives of the present invention have been employed to form an assembly of cyanate ester composite articles, the entire assembly may then be subjected to chemical etching processes in preparation for a subsequent metal plating. The manner of etching the composite and bondline surfaces forms no part of the present invention and may be accomplished in any appropriate etching process. Preferably, the surface is etched in accordance with the method disclosed in the application entitled "Preparation of Cyanate Ester Polymers and Composites for Metal Plating" (Ser. No. 08/339,380), which recites treating the surface of cyanate ester polymer composites with a preheated solution comprising a quaternary ammonium hydroxide or a primary amine. In general, the method disclosed in this related application, discussed below in greater detail, involves immersing the surface of the cured cyanate ester resin composite to be metal-plated into the preheated solution and rinsing the surface with water and/or alcohol upon removal from the solution.

Accordingly, the first step in pretreating the cyanate ester resin composite assembly involves immersing the assembly surface in a preheated etching solution comprising a quaternary ammonium hydroxide or a primary amine. In the event that a quaternary ammonium hydroxide is chosen to etch the composite, the surface of the cured resin composite is placed in contact with a preheated solution comprising a quaternary ammonium hydroxide ($R_4$—NOH) where R may be represented by an alkyl group, aryl-alkyl group, a hydroxy-alkyl group, or an alkoxy-alkyl group. More specifically, the quaternary ammonium hydroxide may be represented by such compounds as tetrabutylammonium hydroxide, benzyltrimethyl-ammonium hydroxide, tetramethylammonium hydroxide, tetraethylammonium hydroxide, tetrapropylammonium hydroxide, tetrapentylammonium hydroxide, tetrahexylammonium hydroxide, and (2-hydroxyethyl) trimethyl ammonium hydroxide, which is also known as choline. Preferably, the alkyl groups employed have chain lengths ranging from one to six carbon atoms. Each of these quaternary ammonium hydroxide compounds is commercially available. A quaternary ammonium hydroxide solution is effective at a concentration ranging from as little as 4 wt % but may be employed without dilution.

In the event that a primary amine is used to etch the cyanate ester resin composite assembly, the surface of the assembly is placed in contact with a preheated solution comprising a primary amine (R—$NH_2$) where R may be represented by an alkyl group, an aryl-alkyl group, a hydroxy-alkyl group, or an alkoxy-alkyl group. More specifically, suitably-employed primary amines must have a boiling point ("BP") significantly higher than the operating temperature of the solution, which is preferably maintained at a temperature between 80° C. and 125° C. Examples of suitable primary amines include triethylenetetraamine (BP=266° C.), hexanediamine (BP=204° C.), octylamine (BP=175° C.), and ethylenediamine (BP=118° C.). Other primary amines believed suitable include diethylenetriamine, tetraethylenepentaamine, 1,7-diaminoheptane, 2-methyl-1,5-pentanediamine, 1,5-pentanedi-amine, 1,3-propanediamine, 1,2-propanediamine, 1,4-butanediamine, pentylamine, hexyl-amine, heptylamine, octylamine, nonylamine, and decylamine. Each of these primary amines is commercially available and is preferably employed without dilution from its commercially-available concentration. Secondary and tertiary amines are not suitable because they either react extremely slowly or not at all. Notably, triethylenetetraamine has both primary and secondary amine groups, but the secondary amine groups are not believed to contribute significantly to texturizing the cyanate ester resin composite surface.

A two-step etching process may be employed using preheated solutions comprising primary amines. More particularly, the cyanate ester resin composite assembly is first immersed in a relatively aggressive primary amine and then immersed in a relatively less aggressive primary amine. Examples of relatively aggressive primary amines are those primary amines within the class of short-chain primary diamines.

Regardless of the whether the preheated solution comprises a quaternary ammonium hydroxide or a primary amine, the preheated solution may also optionally comprise an additional solvent, such as ethoxyethanol, propanediol, and pyrrolidone, among others. Such solvents serve various purposes, including to dissolve decomposition products; to dilute the preheated solution; to swell the undecomposed portion of the resin; and to smooth the surface of the resin.

The temperature of the preheated solution is preferably maintained at a temperature within the range of about 80° to 125° C., with the most preferable temperature depending upon the particular cured cyanate ester resin composite being treated. If the temperature is too low, the adhesion achieved may be less than optimal. On the other hand, if the temperature is too high, the chemical reaction rate is greatly accelerated so that the process may be uncontrollable. In reality, the upper temperature limit is often determined by the refluxing temperature of the solution. It is preferable that the process temperature be well below the boiling point of the solution.

To perform the chemical etching treatment, the surface of the cyanate ester composite assembly is immersed in the preheated solution for at least 10 seconds. Preferably, the assembly remains immersed for a period of time ranging from 10 seconds to 20 minutes. An immersion of less than 10 seconds does not adequately prepare the surface for metal plating, while an immersion lasting more than 20 minutes dissolves an excessive amount of resin, resulting in loss of adhesion.

At the conclusion of the immersion step, the cyanate ester resin composite assembly is typically removed from the preheated solution, rinsed, and dried. The assembly surface may be rinsed with water (preferably deionized), an organic solvent, or a combination thereof, with the purpose of rinsing being to smooth the surface and to partially redissolve decomposition products. Solvents that may be employed as rinsing agents include, but are not limited to, those common organic solvents listed above for use in the preheated solution. The assembly surface may be rinsed with room-temperature water and/or organic solvent from a beaker for 5 minutes or more, but typically 30 seconds of rinsing is sufficient. The etched surface is then dried, which is preferably accomplished either by allowing the resin surface to air-dry at room temperature or by blowing the surface dry with a stream of nitrogen. Once dry, the cyanate ester resin composite assembly surface, including any exposed bondlines of the present adhesive composition, is fully prepared for metal plating and may be plated at any time for up to one week.

The method used to perform the metal plating to the cyanate ester resin composite assembly, having been prepared for plating by chemical etching, does not form part of the invention and may be accomplished by any of the conventional processes known in the art, such as electroplating, electroless chemistry, and sputtering. One traditional method entails four basic sequential steps and utilizes both electroless chemistry and electroplating. First, the assembly surface is treated with an acidic solution of palladium chloride and stannous chloride. This acidic solution is available commercially; for example, it is sold under the trade name Cataposit 44 by Shipley. Second, the assembly surface is treated with a hydrochloric acid accelerator, such as commercially-available Accelerator No. 19 from Shipley. Notably, these first two steps together activate (or deoxidize) the composite and adhesive metal filler in preparation for electroless plating. Third, the assembly surface is treated with either a nickel or copper electroless plating solution. One electroless nickel plating solution is prepared by combining 150 ml of Solution A with 100 ml of Solution B, both of which are commercially available from Allied Kelite, and then diluting the 250 ml of solution to 1 L with water. Alternatively, an electroless copper solution can be prepared by mixing Enplate Cu-700A (6% by volume), Enplate Cu-700B (6% by volume), Enplate Cu-700C (2.25% by volume), and water. Fourth, and finally, the assembly surface is electroplated with a metal aside from nickel or copper, such as silver.

Optionally, after the composite assembly has been plated, the metal-plated assembly surface is then be baked to further harden the metal coating. This final cure is conducted at about 200° F. for a period of several hours, as needed. At the conclusion of the final cure, a strong metal coating will have been securely applied to the assembly surface, including to the bondlines of adhesives formulated in the practice of the invention, thereby providing the assembly with a comprehensive highly conductive surface.

Not only do the adhesives of the present invention exhibit strong adhesion (a plating adhesion value of 5 as measured by modified ASTM D3359 simultaneously with plating to a cyanate ester composite substrate) to subsequently plated metals as illustrated in the examples below, but certain formulations of the present adhesives also boast a high peel strength and high lap shear strength (measured with an Instron tensile pull machine per ASTM D-1876 and D-1002, respectively) on aluminum substrates. This is not attainable with cyanate ester filled formulations (see, e.g., coupon nos. 5–9 of Table I), which have high peel strength but poor plateability. Achieving a high peel strength in which the distribution of peel strength has a mean, or average, of at least two standard deviations above 1.5 lbs/in.-width is critical, since if the adhesive even slightly peels away from the composite along the bond edge, the continuity of plating over composite and bondlines is lost, and the electrical circuit is effectively broken at that point. To illustrate the gravity of such peeling, should such plating discontinuities occur on the inside of the microwave housing of satellites, unexpected frequency shifts would result as well as passive intermodulations, both of which can cripple a satellite. Notably, the present adhesives provide peel strengths on the order of ten times that provided by the adhesives in the related application entitled "Plateable Structural Adhesives for Cyanate Ester Composites", which is assigned to the same assignee as the present application and filed on Oct. 27, 1995, as application Ser. No. 08/549,139. In sum, the advantage of the present high peel strength adhesive is that it increases the likelihood of a bond edge remaining glued to the composite surface during the chemically- and thermally-violent plating processes.

To obtain a high peel strength adhesive, the components of the adhesive formulation must be carefully selected. In general, a high peel strength adhesive formulated in accordance with the invention incorporates a rubbery component, such as provided by Heloxy 58005, and an epoxy silane, such as described above. The Heloxy 58005 is present in the uncured polyepoxide resin component at a concentration within the range of about 22 to 32 wt % and the silane is present in the adhesive composition at a concentration within the range of about 0.5 to 2 wt %. The curative employed comprises TEPA and PACM at a preferred ratio by weight of about 1:1.2, respectively. TEPA effects a partial cure of the high peel strength adhesive at room temperature such that the adhesive is only partially cross-linked, thereby enabling sufficient etching. The PACM effects the final cure at an elevated temperature occurring during the final bake described above.

The adhesives of the invention enable one to bond together cyanate ester composite articles into a single assembly without experiencing the absence of plating on the adhesive bondlines. Thus, by employing the present adhesives, the resulting assembly of cyanate ester composite articles exhibits complete coverage by subsequently-plated metals. Moreover, the adhesion between the subsequently-plated metals and the adhesive bondlines, like that between the metals and the cyanate ester composites, is generally very good according to ASTM method D3359B performance standards, as discussed in detail in the examples below.

EXAMPLES

To demonstrate the benefits achieved in the practice of the invention, four series of adhesives were prepared having the formulations respectively reported in Tables I–IV, below. In each case, the particle size of the metal powder or flakes was in the range of 1 to 10 $\mu$m (average particle size, measured by Fisher Sub-Sieve Sizer per ASTM Standard B-330.)

These adhesives were prepared by simply combining the reported ingredients and mixing until a thoroughly wetted mass was achieved having the consistency of flowable paste.

The prepared adhesives were applied to coupons of cured cyanate ester composite. More specifically, panels comprising a cyanate ester resin and graphite fibers were cured using conventional cure cycles as specified by the vendor of the composite. The cyanate ester resin employed in the composite panels was BTCy-1 from Bryte, and the graphite fibers represented about 50 to 55 vol % of the composite. The panels were then cut into plating coupons measuring about 1 inch×2 inches, which were then coated with the described adhesives to a thickness of about 0.050 inch using a spatula The adhesives were allowed to cure at room temperature from 1 to 7 days at cure times specified for each formulation in Tables I–IV.

The adhesive-coated coupons were then etched using a two-step process wherein the panel surface was first immersed in a relatively aggressive primary amine followed by immersion in a relatively nonaggressive primary amine. These primary and secondary etches were conducted for the times and temperatures reported at the bottom of each of Tables I–IV. More specifically, the primary etches were conducted for about 2.25 hours at 65° C. for the adhesives of Tables I–III and for about 2.5 hours at 65° C. for the adhesives of Table IV. The secondary etches were conducted for about 4.5 hours at 45° C. for the adhesives of Table I–III and for about 1.5 hours at 45° C. for the adhesives of Table IV. In this manner, the adhesive coatings on the coupons were cured and etched.

The etched adhesive coating was then plated with a first layer of copper followed by a second layer of silver. More particularly, the adhesive-coated coupons surfaces were first cleaned with acidic solutions then plated with copper by immersion in an electroless plating solution and finally electroplated with silver. The thicknesses of the copper and silver layers were about 100 and 300 µin., respectively.

Thereafter, the adhesion between the adhesive-coated panel surface and the metal plating was determined in accordance with a modified version of ASTM method D3359 "Test Method B—Cross-Cut Tape Test" (hereinafter "ASTM method D3359B") which is specifically used to assess the adhesion of coating films to metallic substrates by applying and removing pressure-sensitive tape over cuts made in the film. In the standard D-3359 tape test, a cross-hatch pattern is scribed through the metallic plating with a razor sharp instrument. To this surface a pressure sensitive tape with an adhesion of 40 to 45 oz./in.-width is applied and peeled. Depending upon how many squares of plating are removed from the substrate by peeling the tape, a numerical rating is ascribed to the test. The best adhesion rating is a "5", which is designated when no plating is removed from the surface during the peel.

Rather than employ tapes having adhesion ranging from 40 to 45 oz./in.-width as specified in ASTM D-3359, a range of pressure-sensitive tapes were employed that had been calibrated to various levels of plating adhesion. More particularly, pressure-sensitive tapes were calibrated beginning at 45 oz./in.-width up to 150 oz./in.-width plating adhesions. Each plating coupon was first tested with a tape having a relatively low adhesion rating and then was tested with tapes having incrementally higher levels of adhesion until the removal of metal was observed. As such, this modified ASTM D-3359 test is more aggressive than the standard ASTM D-3359 test described above. The plating adhesion of each plating coupon is reported in Tables I–IV.

The adhesives formulated in accordance with the present invention exhibit adhesion ratings of "5" as reported in Tables I–IV. These adhesives are found in Table I, coupon nos. 17–18, 21–22, and 25–26; Table II, coupon nos. 5, 25–26, 30, 33–34, and 37–38; Table III, coupon nos. 1–2, 5–6, 13–14, 17–18, 21–22, 25–26, 29–30, and 37–38; and Table IV, coupon nos. 17–18.

The good adhesion characteristics of "wickable" adhesives were also tested. Wickable adhesives have metal filler at average particle sizes ranging from about 1 to 5 µm. Coupons coated with wickable adhesives are: coupon nos. 25–26 of Table II; coupon nos. 37–38 of Table III; and coupon nos. 13–14 of Table IV. Each of these examples had ratings of "5" with the 150 oz./in.-width tape pull on their cross-hatched surfaces. Thus, these wickable adhesives were plated with superior quality after having been surface etched.

The superior platability of a formulation optimized for high peel strength achieved in the practice of the invention is specifically illustrated by coupon nos. 17–18 of Table IV. These adhesives not only plated well, with an adhesion rating of "5" with the 150 oz./in.-width tape test, but also had a peel strength of 8.6 lbs./in.-width and a lap shear strength of 3.8 KSI on an aluminum substrate as measured with an Instron tensile pull machine per ASTM D-1876 and D-1002, respectively. Thus, adhesives formulated in the practice of the invention offer protection against plating discontinuities arising from the adhesive peeling away from the composite at the bond edge.

To illustrate that cyanate ester polymer filler as recited in the related application entitled "Plateable Structural Adhesives for Cyanate Ester Composites" do not plate as well as the present adhesives, several coupons were formulated with cyanate ester filler instead of metal filler. More specifically, the following coupons were coated with cyanate ester-filled adhesives instead of a metal filler: Table I, coupon nos. 1–16 and 33–36; and Table IV, coupon nos. 25–32. Xu-371 and BTCy-1 are cyanate ester resins that are commercially-available from Bryte Technologies. It is noted that the adhesions achieved with these cyanate ester-filled adhesive formulations are poor in comparison to those achieved in the practice of the present invention.

The poor adhesion achieved with nickel filler rather than copper filler is also illustrated in these examples. More specifically, coupon nos. 13–20 in Table II were coated with nickel-filled adhesives and exhibited poor adhesion.

To illustrate that the adhesive should be exposed to air during cure to achieve optimum adhesion, certain coupons were cured against steel. As a result, the adhesion exhibited by these coupons suffered. Various adhesive formulations and cure times and temperatures were employed to determine whether the requirement for air exposure during cure could be eliminated: however, in every case of cure without exposure to air the adhesion was poor. The coupons cured against steel include Table I coupon nos. 19–20, 23–24, 27–28, 31–32, 35–36, and 39–40; Table II coupon nos. 3–4, 6–8, 11–12, 23–24, 27–28, 31–32, 35–36, and 39–40; Table III coupon nos. 3–4, 7–8, 11–12, 15–16, 19–20, 23–24, 27–28, 31–32, 35–36, and 39–40; and Table IV coupon nos. 15–16, 19–20, 23–24, and 35–36. It is noted that cure times of as long as 7 days against steel still do not provide the adhesion attained in exposed-air cures (see Table 2, coupon nos. 6–8).

The need for a secondary curative to complement TEPA is evident in the examples. In fact, the use of PACM as a secondary curative to TEPA for the Heloxy 58005-based formulations of coupon nos. 29 and 30 of Table I was found to be essential. A purely TEPA-based cure at room temperature provided too much cross-linking, and the epoxy was not etched enough by the amine such that insufficient copper was exposed. In comparison, the use of two curatives allowed for a partial cure at room temperature and an easy-to-etch epoxy.

The adverse effects resulting from indiscriminately adding too much fumed silica (in the form of Cabosil) was demonstrated by the following coupons: Table II coupon nos. 9–10; Table III coupon nos. 9–10; and Table IV coupon nos. 33–34. These formulations were formulated in accordance with the invention except for containing at least 1 wt % of Cabosil. It was concluded that Cabosil inhibits plating adhesion.

Likewise, the indiscriminate addition of too much ceramic material was demonstrated to adversely affect the adhesive formulations. More specifically, while ceramics can be added to decrease the coefficient of thermal expansion of the adhesive formulations, the addition of too much ceramic material renders the adhesive ineffective, as demonstrated in coupon nos. 21–24 of Table IV. In those formulations, 4 grams of 1002E E-glass spheres from Potter Industries were employed, with the spheres having a particle size of 2 $\mu$m. Only 1 to 2 grams of such spheres are necessary for a plateable adhesive. Although an anti-foamer (Mallinkrodt BYK052) was added to these heavily-loaded formulations to improve their flowability, their adhesion remained unacceptably low.

The Table II coupon nos. 21–22 illustrate that EPON 815 may be preferable to EPON 828. In those formulations, EPON 828 was employed alone, and the adhesion was less than acceptable. It is postulated that EPON 828 does not etch as readily as EPON 815, so that perhaps not enough copper was exposed during the etch of these formulations.

Finally, the adhesive formulations represented by coupon nos. 33–34 of Table III exhibited poor adhesions. Although the ratio of PACM to TEPA in these formulations is less than ideal, it is contemplated that the elevated cure at 120° F. caused too much cross-linking, making the epoxy difficult to etch.

TABLE 1

| Coupon | RESIN | CURATIVE | FILLER | OTHER | CURE | TAPE TEST 45 oz | TAPE TEST 150 oz |
|---|---|---|---|---|---|---|---|
| 1 | 1.1 g EPON 828<br>0.4 g Heloxy 58005 | 0.08 g TEPA<br>0.12 g PACM<br>0.02 g Ancamine K54 | 0.5 g Xu 371 (10 $\mu$m) | 1% Silane A-187<br>1% Cabosil | 6 day cure RT in air | 0,0 | |
| 2 | 1.1 g EPON 828<br>0.4 g Heloxy 58005 | 0.08 g TEPA<br>0.12 g PACM<br>0.02 g Ancamine K54 | 0.5 g Xu 371 (10 $\mu$m) | 1% Silane A-187<br>1% Cabosil | 6 day cure RT in air | 0,0 | |
| 3 | 1.1 g EPON 828<br>0.4 g Heloxy 58005 | 0.08 g TEPA<br>0.12 g PACM<br>0.02 g Ancamine K54 | 0.5 g Xu 371 (10 $\mu$m) | 1% Silane A-187<br>1% Cabosil | 6 day cure RT against steel | 0,0 | |
| 4 | 1.1 g EPON 828<br>0.4 g Heloxy 58005 | 0.08 g TEPA<br>0.12 g PACM<br>0.02 g Ancamine K54 | 0.5 g Xu 371 (10 $\mu$m) | 1% Silane A-187<br>1% Cabosil | 6 day cure RT against steel | 0,0 | |
| 5 | 0.8 g EPON 828<br>3.0 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT in air | 0,0 | |
| 6 | 0.8 g EPON 828<br>3.0 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT in air | 0,0 | |
| 7 | 0.8 g EPON 828<br>3.0 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT against steel | 2?,0 | |
| 8 | 0.8 g EPON 828<br>3.0 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT against steel | 1,0 | |
| 9 | 1.1 g EPON 828<br>0.4 g Heloxy 58005 | 0.08 g TEPA<br>0.16 g PACM | 0.3 g Xu 371 (10 $\mu$m) | 1% Silane A-187<br>1% Cabosil | 1 day cure RT in air | 3,5 | 3,5 |
| 10 | 1.1 g EPON 828<br>0.4 g Heloxy 58005 | 0.08 g TEPA<br>0.16 g PACM | 0.3 g Xu 371 (10 $\mu$m) | 1% Silane A-187<br>1% Cabosil | 1 day cure RT in air | 5,5 | 5,5 |
| 11 | 1.1 g EPON 828<br>0.4 g Heloxy 58005 | 0.08 g TEPA<br>0.16 g PACM | 0.3 g Xu 371 (10 $\mu$m) | 1% Silane A-187<br>1% Cabosil | 1 day cure RT against steel | 0,1 | 0,0 |
| 12 | 1.1 g EPON 828<br>0.4 g Heloxy 58005 | 0.08 g TEPA<br>0.16 g PACM | 0.3 g Xu 371 (10 $\mu$m) | 1% Silane A-487<br>1% Cabosil | 1 day cure RT against steel | 4,2 | 4,1 |
| 13 | 0.75 g EPON 828<br>0.75 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT in air | 4+,2 | 4+,1 |
| 14 | 0.75 g EPON 828<br>0.75 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT in air | 2+,2+ | 2,2 |
| 15 | 0.75 g EPON 828<br>0.75 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT against steel | 0,2 | 0,1 |
| 16 | 0.75 g EPON 828<br>0.75 g EPON 815<br>0.4 g Heloxy 58005 | 0.07 g TEPA<br>0.14 g PACM<br>0.01 g Ancamine K54 | 1.0 g Xu 371 (10 $\mu$m) | 0.5% Silane A-187<br>1% Cabosil | 1 day cure RT against steel | 2,2 | 1,2 |
| 17 | 0.75 g EPON 815<br>0.75 g EPON 828 | 0.18 g TEPA | 3.0 g Cu (10 $\mu$m) | 0.5% Silane A-187 | 2 day cure RT in air | 5 | 4+ |
| 18 | 0.75 g EPON 815<br>0.75 g EPON 828 | 0.18 g TEPA | 3.0 g Cu (10 $\mu$m) | 0.5% Silane A-187 | 2 day cure RT in air | 5 | 4+ |

TABLE 1-continued

| Coupon | RESIN | CURATIVE | FILLER | OTHER | CURE | TAPE TEST 45 oz | TAPE TEST 150 oz |
|---|---|---|---|---|---|---|---|
| 19 | 0.75 g EPON 815<br>0.75 g EPON 828 | 0.18 g TEPA | 3.0 g Cu (10 μm) | 0.5% Silane A-187 | 2 day cure RT against steel | 4 | 2 |
| 20 | 0.75 g EPON 815<br>0.75 g EPON 828 | 0.18 g TEPA | 3.0 g Cu (10 μm) | 0.5% Silane A-187 | 2 day cure RT against steel | 2 | 1 |
| 21 | 0.75 g EPON 815<br>0.75 g EPON 828 | 0.18 g TEPA | 3.0 g Cu (10 μm) | | 2 day cure RT in air | 5 | 5 |
| 22 | 0.75 g EPON 815<br>0.75 g EPON 828 | 0.18 g TEPA | 3.0 g Cu (10 μm) | | 2 day cure RT in air | 5 | 5 |
| 23 | 0.75 g EPON 815<br>0.75 g EPON 828 | 0.18 g TEPA | 3.0 g Cu (10 μm) | | 2 day cure RT against steel | 4+ | 3+ |
| 24 | 0.75 g EPON 815<br>0.75 g EPON 828 | 0.18 g TEPA | 3.0 g Cu (10 μm) | | 2 day cure RT against steel | 4+ | 4 |
| 25 | 1.5 g EPON 815 | 0.18 g TEPA | 5.0 g Cu (10 μm) | 0.5% Silane A-187 | 2 day cure RT in air (tacky) | 4+ | 4+ |
| 26 | 1.5 g EPON 815 | 0.18 g TEPA | 5.0 g Cu (10 μm) | 0.5% Silane A-187 | 2 day cure RT in air (tacky) | 5 | 5 |
| 27 | 1.5 g EPON 815 | 0.18 g TEPA | 5.0 g Cu (10 μm) | 0.5% Silane A-187 | 2 day cure RT against steel | 0 | |
| 28 | 1.5 g EPON 815 | 0.18 g TEPA | 5.0 g Cu (10 μm) | 0.5% Silane A-187 | 2 day cure RT against steel | 0 | |
| 29 | 0.55 g EPON 815<br>0.55 g EPON 828<br>0.4 g Heloxy 58005 | 0.16 g TEPA | 3.0 g Cu (10 μm) | 0.5% Silane A-187 | 2 day cure RT in air | 0 | |
| 30 | 0.55 g EPON 815<br>0.55 g EPON 828<br>0.4 g Heloxy 58005 | 0.16 g TEPA | 3.0 g Cu (10 μm) | 0.5% Silane A-187 | 2 day cure RT in air | 0 | |
| 31 | 0.55 g EPON 815<br>0.55 g EPON 828<br>0.4 g Heloxy 58005 | 0.16 g TEPA | 3.0 g Cu (10 μm) | 0.5% Silane A-187 | 2 day cure RT against steel | 0 | |
| 32 | 0.55 g EPON 815<br>0.55 g EPON 828<br>0.4 g Heloxy 58005 | 0.16 g TEPA | 3.0 g Cu (10 μm) | 0.5% Silane A-187 | 2 day cure RT against steel | 0 | |
| 33 | 1.5 g EPON 828 | 0.16 g TEPA<br>0.03 g Ancamine K54 | 0.5 g Xu 371 (20 μm) | 1% Cabosil | 1 day cure RT in air | 0 | |
| 34 | 1.5 g EPON 828 | 0.16 g TEPA<br>0.03 g Ancamine K54 | 0.5 g Xu 371 (20 μm) | 1% Cabosil | 1 day cure RT in air | 0 | |
| 35 | 1.5 g EPON 828 | 0.16 g TEPA<br>0.03 g Ancamine K54 | 0.5 g Xu 371 (20 μm) | 1% Cabosil | 1 day cure RT against steel | 0 | |
| 36 | 1.5 g EPON 828 | 0.16 g TEPA<br>0.03 g Ancamine K54 | 0.5 g Xu 371 (20 μm) | 1% Cabosil | 1 day cure RT against steel | 0 | |
| 37 | 1.5 g EPON 828 | 0.16 g TEPA<br>0.03 g Ancamine K54 | 0.4 g Xu 371 (20 μm)<br>2.0 g Cu (10 μm) | 1% Cabosil | 1 day cure RT in air | 0 | |
| 38 | 1.5 g EPON 828 | 0.16 g TEPA<br>0.03 g Ancamine K54 | 0.4 g Xu 371 (20 μm)<br>2.0 g Cu (10 μm) | 1% Cabosil | 1 day cure RT in air | 0 | |
| 39 | 1.5 g EPON 828 | 0.16 g TEPA<br>0.03 g Ancamine K54 | 0.4 g Xu 371 (20 μm)<br>2.0 g Cu (10 μm) | 1% Cabosil | 1 day cure RT against steel | 0 | |
| 40 | 1.5 g EPON 828 | 0.16 g TEPA<br>0.03 g Ancamine K54 | 0.4 g Xu 371 (20 μm)<br>2.0 g Cu (10 μm) | 1% Cabosil | 1 day cure RT against steel | 0 | |

NOTE:
Primary etch is @ 2.25 min @ 65° C., silver plated size is 1" × 2", secondary etch is @ 4.5 min @ 45° C., and silver plated finish is 100/300 μin Cu/Ag

TABLE II

| Coupon | RESIN | CURATIVE | FILLER | OTHER | CURE | TAPE TEST 45 oz | TAPE TEST 150 oz |
|---|---|---|---|---|---|---|---|
| 1 | 0.8 g EPON 828<br>0.4 g Heloxy 58005 | 0.08 g TEPA<br>0.16 g PACM | 0.3 g Xu 371 (10 μm)<br>2.5 g Cu (10 μm) | 0.5% Silane A-187<br>1% Cabosil | 1 day cure RT in air | 0 | |
| 2 | 0.8 g EPON 828<br>0.4 g Heloxy 58005 | 0.08 g TEPA<br>0.16 g PACM | 0.3 g Xu 371 (10 μm)<br>2.5 g Cu (10 μm) | 0.5% Silane A-187<br>1% Cabosil | 1 day cure RT in air | 0 | |
| 3 | 0.8 g EPON 828<br>0.4 g Heloxy 58005 | 0.08 g TEPA<br>0.16 g PACM | 0.3 g Xu 371 (10 μm)<br>2.5 g Cu (10 μm) | 0.5% Silane A-187<br>1% Cabosil | 1 day cure RT against steel | 0* | |
| 4 | 0.8 g EPON 828<br>0.4 g Heloxy 58005 | 0.08 g TEPA<br>0.16 g PACM | 0.3 g Xu 371 (10 μm)<br>2.5 g Cu (10 μm) | 0.5% Silane A-187<br>1% Cabosil | 1 day cure RT against steel | 4+ | 4 |
| 5 | 1.5 g EPON 815 | 0.18 g TEPA | 7.5 g Cu Powder | 0.5% Silane A-187 | 7 day cure RT in air | 5 | 5 |
| 6 | 1.5 g EPON 815 | 0.18 g TEPA | 7.5 g Cu Powder | 0.5% Silane A-187 | 7 day cure RT against steel | 2 | 2 |
| 7 | 1.5 g EPON 815 | 0.18 g TEPA | 7.5 g Cu Powder | 0.5% Silane A-187 | 7 day cure RT against steel | 0 | |
| 8 | 1.5 g EPON 815 | 0.18 g TEPA | 7.5 g Cu Powder | 0.5% Silane A-187 | 7 day cure RT against steel | 0 | |

TABLE II-continued

| Coupon | RESIN | CURATIVE | FILLER | OTHER | CURE | TAPE TEST 45 oz | TAPE TEST 150 oz |
|---|---|---|---|---|---|---|---|
| 9 | 0.75 g EPON 815<br>0.75 g EPON 828 | 0.18 g TEPA | 3.0 g Cu Powder | 2% Cabosil | 3 day cure RT in air | 0 | |
| 10 | 0.75 g EPON 815<br>0.75 g EPON 828 | 0.18 g TEPA | 3.0 g Cu Powder | 2% Cabosil | 3 day cure RT in air | 2 | 2 |
| 11 | 0.75 g EPON 815<br>0.75 g EPON 828 | 0.18 g TEPA | 3.0 g Cu Powder | 2% Cabosil | 3 day cure RT against steel | 0 | |
| 12 | 0.75 g EPON 815<br>0.75 g EPON 828 | 0.18 g TEPA | 3.0 g Cu Powder | 2% Cabosil | 3 days RT against steel | 0 | |
| 13 | 0.75 g EPON 815<br>0.75 g EPON 828 | 0.18 g TEPA | 3.0 g Ni Powder | 2% Cabosil | 3 day cure RT in air | 0 | |
| 14 | 0.75 g EPON 815<br>0.75 g EPON 828 | 0.18 g TEPA | 3.0 g Ni Powder | 2% Cabosil | 3 day cure RT in air | 0 | |
| 15 | 0.75 g EPON 815<br>0.75 g EPON 828 | 0.18 g TEPA | 3.0 g Ni Powder | 1% Cabosil | 3 day cure RT against steel | 0 | |
| 16 | 0.75 g EPON 815<br>0.75 g EPON 828 | 0.18 g TEPA | 3.0 g Ni Powder | 1% Cabosil | 3 day cure RT against steel | 0 | |
| 17 | 0.75 g EPON 815<br>0.75 g EPON 828 | 0.18 g TEPA | 3.0 g Ni Powder | | 1 day cure RT in air | 2 | 0 |
| 18 | 0.75 g EPON 815<br>0.75 g EPON 828 | 0.18 g TEPA | 3.0 g Ni Powder | | 1 day cure RT in air | 3− | 3− |
| 19 | 0.75 g EPON 815<br>0.75 g EPON 828 | 0.18 g TEPA | 3.0 g Ni Powder | | 1 day cure RT against steel | 0 | 0 |
| 20 | 0.75 g EPON 815<br>0.75 g EPON 828 | 0.18 g TEPA | 3.0 g Ni Powder | | 1 day cure RT against steel | 0 | 0 |
| 21 | 1.5 g EPON 828 | 0.18 g TEPA | 3.0 g Cu Powder | | 1 day cure RT in air (tacky) | 0 | 0 |
| 22 | 1.5 g EPON 828 | 0.18 g TEPA | 3.0 g Cu Powder | | 1 day cure RT in air (tacky) | 5 | 1 |
| 23 | 1.5 g EPON 828 | 0.18 g TEPA | 3.0 g Cu Powder | | 1 day cure RT against steel | 4 | 2 |
| 24 | 1.5 g EPON 828 | 0.18 g TEPA | 3.0 g Cu Powder | | 1 day cure RT against steel | 4− | 1 |
| 25 | 1.5 g EPON 815 | 0.16 g TEPA<br>0.03 g Ancamine K54 | 3.0 g Cu | 0.35% Cabosil | 1 day cure RT in air (very slight tack) | 5 | 5 |
| 26 | 1.5 g EPON 815 | 0.16 g TEPA<br>0.03 g Ancamine K54 | 3.0 g Cu | 0.35% Cabosil | 1 day cure RT in air (very slight tack) | 5 | 5 |
| 27 | 1.5 g EPON 815 | 0.16 g TEPA<br>0.03 g Ancamine K54 | 3.0 g Cu | 0.35% Cabosil | 1 day cure RT against steel | 0 | 0 |
| 28 | 1.5 g EPON 815 | 0.16 g TEPA<br>0.03 g Ancamine K54 | 3.0 g Cu | 0.35% Cabosil | 1 day cure RT against steel | 0 | 0 |
| 29 | 1.5 g EPON 815 | 0.18 g TEPA | 3.0 g Cu | 0.35% Cabosil | 1 day cure RT in air (tacky) | 3 | 2 |
| 30 | 1.5 g EPON 815 | 0.18 g TEPA | 3.0 g Cu | 0.35% Cabosil | 1 day cure RT in air (tacky) | 5 | 5 |
| 31 | 1.5 g EPON 815 | 0.18 g TEPA | 3.0 g Cu | 0.35% Cabosil | 1 day cure RT against steel | 0 | 0 |
| 32 | 1.5 g EPON 815 | 0.18 g TEPA | 3.0 g Cu | 0.35% Cabosil | 1 day cure RT against steel | 0 | 0 |
| 33 | 0.75 g EPON 815<br>0.75 g EPON 828 | 0.18 g TEPA | 3.0 g Cu Powder | | 3 day cure RT in air | 5 | 5 |
| 34 | 0.75 g EPON 815<br>0.75 g EPON 828 | 0.18 g TEPA | 3.0 g Cu Powder | | 3 day cure RT in air | 4+ | 4 |
| 35 | 0.75 g EPON 815<br>0.75 g EPON 828 | 0.18 g TEPA | 3.0 g Cu Powder | | 3 day cure RT against steel | 2 | 0 |
| 36 | 0.75 g EPON 815<br>0.75 g EPON 828 | 0.18 g TEPA | 3.0 g Cu Powder | | 3 day cure RT against steel | 2 | 0 |
| 37 | 1.5 g EPON 828 | 0.18 g TEPA | 5.0 g Cu Powder | | 1 day cure RT and 1 hr. 120° F. in air | 5 | 5 |
| 38 | 1.5 g EPON 828 | 0.18 g TEPA | 5.0 g Cu Powder | | 1 day cure RT and 1 hr. 120° F. in air | 5 | 5 |
| 39 | 1.5 g EPON 828 | 0.18 g TEPA | 5.0 g Cu Powder | | 1 day cure RT and 1 hr. 120° F. against steel | 0 | 0 |
| 40 | 1.5 g EPON 828 | 0.18 g TEPA | 5.0 g Cu Powder | | 1 day cure RT and 1 hr. 120° F. against steel | 0 | 0 |

NOTE:
Primary etch is @ 2.25 min @ 65° C., silver plated size is 1" × 2", secondary etch is @ 4.5 min @ 45° C., and silver plated finish is 100/300 μin Cu/Ag;
*Coupon #3 mainly an air cure due to molding defect.

TABLE III

| Coupon | RESIN | CURATIVE | FILLER | OTHER | CURE | TAPE TEST 45 oz | TAPE TEST 150 oz |
|---|---|---|---|---|---|---|---|
| 1 | 1.5 g EPON 828 | 0.18 g TEPA<br>0.01 g Ancamine K54 | 5.0 g Cu (10 μm) | | 1 day cure RT; 1 hr. 120° F. in air | 5 | 5 |
| 2 | 1.5 g EPON 828 | 0.18 g TEPA<br>0.01 g Ancamine K54 | 5.0 g Cu (10 μm) | | 1 day cure RT; 1 hr. 120° F. in air | 5 | 5 |
| 3 | 1.5 g EPON 828 | 0.18 g TEPA<br>0.01 g Ancamine K54 | 5.0 g Cu (10 μm) | | 1 day cure RT; 1 hr. 120° F. against steel | 1 | 0 |
| 4 | 1.5 g EPON 828 | 0.18 g TEPA<br>0.01 g Ancamine K54 | 5.0 g Cu (10 μm) | | 1 day cure RT; 1 hr. 120° F. against steel | 1 | 1− |
| 5 | 1.5 g EPON 828 | 0.18 g TEPA<br>0.01 g Ancamine K54 | 5.0 g Cu (10 μm) | | 1 day cure RT; 2 hr. 120° F. in air | 5 | 5 |
| 6 | 1.5 g EPON 828 | 0.18 g TEPA<br>0.01 g Ancamine K54 | 5.0 g Cu (10 μm) | | 1 day cure RT; 2 hr. 120° F. in air | 5 | 5 |
| 7 | 1.5 g EPON 828 | 0.18 g TEPA<br>0.0 1 g Ancamine K54 | 5.0 g Cu (10 μm) | | 1 day cure RT; 2 hr. 120° F. against steel | 0 | 0 |
| 8 | 1.5 g EPON 828 | 0.18 g TEPA<br>0.01 g Ancamine K54 | 5.0 g Cu (10 μm) | | 1 day cure RT; 2 hr. 120° F. against steel | 0 | 0 |
| 9 | 0.8 g EPON 828<br>0.4 g Heloxy 58005 | 0.12 g PACM<br>0.10 g TEPA | 5.0 g Cu (10 μm) | 0.5% Silane A-187<br>1% Cabosil | 1 day cure RT; 1 hr. 120° F. in air | 4 | 2+ |
| 10 | 0.8 g EPON 828<br>0.4 g Heloxy 58005 | 0.12 g PACM<br>0.10 g TEPA | 5.0 g Cu (10 μm) | 0.5% Silane A-187<br>1% Cabosil | 1 day cure RT; 1 hr. 120° F. in air | 3 | 0 |
| 11 | 0.8 g EPON 828<br>0.4 g Heloxy 58005 | 0.12 g PACM<br>0.10 g TEPA | 5.0 g Cu (10 μm) | 0.5% Silane A-187<br>1% Cabosil | 1 day cure RT; 1 hr. 120° F. against steel | 0 | 0 |
| 12 | 0.8 g EPON 828<br>0.4 g Heloxy 58005 | 0.12 g PACM<br>0.10 g TEPA | 5.0 g Cu (10 μm) | 0.5% Silane A-187<br>1% Cabosil | 1 day cure RT; 1 hr. 120° F. against steel | 0 | 0 |
| 13 | 0.8 g EPON 828<br>0.4 g Heloxy 58005 | 0.16 g PACM<br>0.08 g TEPA | 5.0 g Cu (10 μm) | 0.5% Silane A-187<br>1% Cabosil | 1 day cure RT; 2 hr. 120° F. in air | 5 | 5 |
| 14 | 0.8 g EPON 828<br>0.4 g Heloxy 58005 | 0.16 g PACM<br>0.08 g TEPA | 5.0 g Cu (10 μm) | 0.5% Silane A-187<br>1% Cabosil | 1 day cure RT; 2 hr. 120° F. in air | 5 | 2+ |
| 15 | 0.8 g EPON 828<br>0.4 g Heloxy 58005 | 0.16 g PACM<br>0.08 g TEPA | 5.0 g Cu (10 μm) | 0.5% Silane A-187<br>1% Cabosil | 1 day cure RT; 2 hr. 120° F. against steel | 0 | 0 |
| 16 | 0.8 g EPON 828<br>0.4 g Heloxy 58005 | 0.16 g PACM<br>0.08 g TEPA | 5.0 g Cu (10 μm) | 0.5% Silane A-187<br>1% Cabosil | 1 day cure RT; 2 hr. 120° F. against steel | 0 | 0 |
| 17 | 0.75 g EPON 815<br>0.75 g EPON 828 | 0.18 g TEPA | 2.0 g Cu (5 μm) | | 2 day cure RT in air | 5 | 5 |
| 18 | 0.75 g EPON 815<br>0.75 g EPON 828 | 0.18 g TEPA | 2.0 g Cu (5 μm) | | 2 day cure RT in air | 5 | 5 |
| 19 | 0.75 g EPON 815<br>0.75 g EPON 828 | 0.18 g TEPA | 2.0 g Cu (5 μm) | | 2 day cure RT against steel | 0 | 0 |
| 20 | 0.75 g EPON 815<br>0.75 g EPON 828 | 0.18 g TEPA | 2.0 g Cu (5 μm) | | 2 day cure RT against steel | 0 | 0 |
| 21 | 0.75 g EPON 815<br>0.75 g EPON 828 | 0.18 g TEPA | 3.0 g Cu (5 μm) | | 2 day cure RT in air | 5 | 5 |
| 22 | 0.75 g EPON 815<br>0.75 g EPON 828 | 0.18 g TEPA | 3.0 g Cu (5 μm) | | 2 day cure RT in air | 5 | 5 |
| 23 | 0.75 g EPON 815<br>0.75 g EPON 828 | 0.18 g TEPA | 3.0 g Cu (5 μm) | | 2 day cure RT against steel | 0 | 0 |
| 24 | 0.75 g EPON 815<br>0.75 g EPON 828 | 0.18 g TEPA | 3.0 g Cu (5 μm) | | 2 day cure RT against steel | 0 | 0 |
| 25 | 0.75 g EPON 815<br>0.75 g EPON 828 | 0.18 g TEPA | 5.0 g Cu (5 μm) | | 2 day cure RT in air | 5 | 5 |
| 26 | 0.75 g EPON 815<br>0.75 g EPON 828 | 0.18 g TEPA | 5.0 g Cu (5 μm) | | 2 day cure RT in air | 5 | 5 |
| 27 | 0.75 g EPON 815<br>0.75 g EPON 828 | 0.18 g TEPA | 5.0 g Cu (5 μm) | | 2 day cure RT against steel | 0 | 0 |
| 28 | 0.75 g EPON 815<br>0.75 g EPON 828 | 0.18 g TEPA | 5.0 g Cu (5 μm) | | 2 day cure RT against steel | 0 | 0 |
| 29 | 0.8 g EPON 828<br>0.4 g Heloxy 58005 | 0.12 g PACM<br>0.10 g TEPA | 5.0 g Cu (5 μm) | 0.5% Silane A-187 | 2 day cure RT in air | 4+ | 4+ |
| 30 | 0.8 g EPON 828<br>0.4 g Heloxy 58005 | 0.12 g PACM<br>0.10 g TEPA | 5.0 g Cu (5 μm) | 0.5% Silane A-187 | 2 day cure RT in air | 5 | 5 |
| 31 | 0.8 g EPON 828<br>0.4 g Heloxy 58005 | 0.12 g PACM<br>0.10 g TEPA | 5.0 g Cu (5 μm) | 0.5% Silane A-187 | 2 day cure RT against steel | 0 | 0 |
| 32 | 0.8 g EPON 828<br>0.4 g Heloxy 58005 | 0.12 g PACM<br>0.10 g TEPA | 5.0 g Cu (5 μm) | 0.5% Silane A-187 | 2 day cure RT against steel | 0 | 0 |
| 33 | 0.8 g EPON 828<br>0.4 g Heloxy 58005 | 0.16 g PACM<br>0.08 g TEPA | 5.0 g Cu (5 μm) | 0.5% Silane A-187 | 2 day cure RT; 2–3 hrs. at 120° F. in air | 0 | 0 |
| 34 | 0.8 g EPON 828<br>0.4 g Heloxy 58005 | 0.16 g PACM<br>0.08 g TEPA | 5.0 g Cu (5 μm) | 0.5% Silane A-187 | 2 day cure RT; 2–3 hrs. at 120° F. in air | 0 | 0 |
| 35 | 0.8 g EPON<br>0.4 g Heloxy 58005 | 0.16 g PACM<br>0.08 g TEPA | 5.0 g Cu (5 μm) | 0.5% Silane A-187 | 2 day cure RT; 2–3 hrs at 120° F. against steel | 0 | 0 |
| 36 | 0.8 g EPON 828<br>0.4 g Heloxy 58005 | 0.16 g PACM<br>0.08 g TEPA | 5.0 g Cu (5 μm) | 0.5% Silane A-187 | 2 day cure RT; 2–3 hrs. at 120° F. against steel | 0 | 0 |
| 37 | 1.0 g EPON 815<br>0.5 g EPON 828 | 0.18 g TEPA | 3.0 g Cu (5 μm) | | 2 day cure RT in air | 5 | 5 |

TABLE III-continued

| Coupon | RESIN | CURATIVE | FILLER | OTHER | CURE | TAPE TEST 45 oz | TAPE TEST 150 oz |
|---|---|---|---|---|---|---|---|
| 38 | 1.0 g EPON 815<br>0.5 g EPON 828 | 0.18 g TEPA | 3.0 g Cu (5 μm) | | 2 day cure RT in air | 5 | 5 |
| 39 | 1.0 g EPON 815<br>0.5 g EPON 828 | 0.18 g TEPA | 3.0 g Cu (5 μm) | | 2 day cure RT against steel | 0 | 0 |
| 40 | 1.0 g EPON 815<br>0.5 g EPON 828 | 0.18 g TEPA | 3.0 g Cu (5 μm) | | 2 day cure RT against steel | 0 | 0 |

NOTE:
Primary etch is @ 2.25 min @ 65° C., silver plated size is 1" × 2", secondary etch is @ 45° C., and silver plated finish is 100/300 μin Cu/Ag;

TABLE IV

| Coupon | RESIN | CURATIVE | FILLER | OTHER | CURE | TAPE TEST 110 oz | TAPE TEST 150 oz |
|---|---|---|---|---|---|---|---|
| 13 | 1.1 g EPON 815<br>0.4 g EPON 828 | 0.15 g TEPA<br>0.03 g Ancamine K54 | 2.5 g Cu (5 μm) | | 2 day cure RT in air | 5 | 5 |
| 14 | 1.1 g EPON 815<br>0.4 g EPON 828 | 0.15 g TEPA<br>0.03 g Ancamine K54 | 2.5 g Cu (5 μm) | | 2 day cure RT in air | 5 | 5 |
| 15 | 1.1 g EPON 815<br>0.4 g EPON 828 | 0.15 g TEPA<br>0.03 g Ancamine K54 | 2.5 g Cu (5 μm) | | 2 day cure RT against steel | 0 | 0 |
| 16 | 1.1 g EPON 815<br>0.4 g EPON 828 | 0.15 g TEPA<br>0.03 g Ancamine K54 | 2.5 g Cu (5 μm) | | 2 day cure RT against steel | 0 | 0 |
| 17 | 0.8 g EPON 828<br>0.3 g EPON 815<br>0.4 g Heloxy 58005 | 0.10 g TEPA<br>0.12 g PACM | 5.0 g Cu (5 μm) | 0.5% Silane A-187 | 2 day cure RT in air | | 5 |
| 18 | 0.8 g EPON 828<br>0.3 g EPON 815<br>0.4 g Heloxy 58005 | 0.10 g TEPA<br>0.12 g PACM | 5.0 g Cu (5 μm) | 0.5% Silane A-187 | 2 day cure RT in air | | 5 |
| 19 | 0.8 g EPON 828<br>0.3 g EPON 815<br>0.4 g Heloxy 58005 | 0.10 g TEPA<br>0.12 g PACM | 5.0 g Cu (5 μm) | 0.5% Silane A-187 | 2 day cure RT against steel | | 0 |
| 20 | 0.8 g EPON 828<br>0.3 g EPON 815<br>0.4 g Heloxy 58005 | 0.10 g TEPA<br>0.12 g PACM | 5.0 g Cu (5 μm) | 0.5% Silane A-187 | 2 day cure RT against steel | | 0 |
| 21 | 1.5 g EPON 815 | 0.15 g TEPA<br>0.03 g Ancamine K54 | 2.5 g Cu (5 μm)<br>4 g 10002E E-glass spheres (2 μm) | 1 drop BYK052 (Mallinkrodt)<br>1 drop Silane A-187 | 2 day cure RT in air | | 0 |
| 22 | 1.5 g EPON 815 | 0.15 g TEPA<br>0.03 g Ancamine K54 | 2.5 g Cu (5 μm)<br>4 g 1 0002E E-glass spheres (2 μm) | 1 drop BYK052 (Mallinkrodt)<br>1 drop Silane A-187 | 2 day cure RT in air | | 2 |
| 23 | 1.5 g EPON 815 | 0.15 g TEPA<br>0.03 g Ancamine K54 | 2.5 g Cu (5μm)<br>4 g 10002E E-glass spheres (2 μm) | 1 drop BYK052 (Mallinkrodt)<br>1 drop Silane A-187 | 2 day cure RT against steel | | 0 |
| 24 | 1.5 g EPON 815 | 0.15 g TEPA<br>003 g Ancamine K54 | 2.5 g Cu (5 μm)<br>4 g 10002E E-glass spheres (2 μm) | 1 drop BYK052 (Mallinkrodt)<br>1 drop Silane A-187 | 2 day cure RT against steel | | 0 |
| 25 | 0.75 g EPON 828<br>0.35 g EPON 815<br>0.4 g Heloxy 58005 | 0.14 g TEPA<br>0.02 g Ancamine K54 | 0.4 g BTCy-1 (10 μm) | 0.5% Silane A-187 | 1 day cure RT in air | | 5 |
| 26 | 0.75 g EPON 828<br>0.35 g EPON 815<br>0.4 g Heloxy 58005 | 0.14 g TEPA<br>0.02 g Ancamine K54 | 0.4 g BTCy-1 (10 μm) | 0.5% Silane A-187 | 1 day cure RT in air | | 3 |
| 27 | 0.75 g EPON 828<br>0.35 g EPON 815<br>0.4 g Heloxy 58005 | 0.14 g TEPA<br>0.02 g Ancamine K54 | 0.4 g BTCy-1 (10 μm) | 0.5% Silane A-187 | 1 day cure RT against steel | | 2 |
| 28 | 0.75 g EPON 828<br>0.35 g EPON 815<br>0.4 g Heloxy 58005 | 0.14 g TEPA<br>0.02 g Ancamine K54 | 0.4 g BTCy-1 (10 μm) | 0.5% Silane A-187 | 1 day cure RT against steel | | 1 |
| 29 | 0.75 g EPON 828<br>0.35 g EPON 815<br>0.4 g Heloxy 58005 | 0.12 g TEPA<br>0.03 g Ancamine K54 | 0.4 g BTCy-1 (10 μm) | 0.5% Silane A-187<br>1% Cabosil | 1 day cure RT in air | | 2 |
| 30 | 0.75 g EPON 828<br>0.35 g EPON 815<br>0.4 g Heloxy 58005 | 0.12 g TEPA<br>0.03 g Ancamine K54 | 0.4 g BTCy-1 (10 μm) | 0.5% Silane A-187<br>1% Cabosil | 1 day cure RT in air | | 0 |
| 31 | 0.75 g EPON 828<br>0.35 g EPON 815<br>0.4 g Heloxy 58005 | 0.12 g TEPA<br>0.03 g Ancamine K54 | 0.4 g BTCy-1 (10 μm) | 0.5% Silane A-187<br>1% Cabosil | 1 day cure RT against steel | | 3 |
| 32 | 0.75 g EPON 828<br>0.35 g EPON 815<br>0.4 g Heloxy 58005 | 0.12 g TEPA<br>0.03 g Ancamine K54 | 0.4 g BTCy-1 (10 μm) | 0.5% Silane A-187<br>1% Cabosil | 1 day RT steel | | 2 |
| 33 | 0.75 g EPON 815<br>0.75 g EPON 828 | 0.18 g TEPA | 0.3 g BTCy-1 (10 μm) | 1% Cabosil | 1 day cure RT in air | 5 | 2 |
| 34 | 0.75 g EPON 815 | 0.18 g TEPA | 0.3 g BTCy-1 (10 μm) | 1% Cabosil | 1 day cure RT in air | 5 | 2 |

TABLE IV-continued

| Coupon | RESIN | CURATIVE | FILLER | OTHER | CURE | TAPE TEST 110 oz | TAPE TEST 150 oz |
|---|---|---|---|---|---|---|---|
| 35 | 0.75 g EPON 828 0.75 g EPON 815 0.75 g EPON 828 | 0.18 g TEPA | 0.3 g BTCy-1 (10 μm) | 1% Cabosil | 1 day cure RT against steel | 5 | 2 |
| 36 | 0.75 g EPON 815 0.75 g EPON 828 | 0.18 g TEPA | 0.3 g BTCy-1 (10 μm) | 1% Cabosil | 1 day cure RT against steel | 5 | 1 |

NOTE:
Primary etch is @ 2.5 min @ 65° C., silver plated size is 1" × 2", secondary etch is @ 1.5 min @ 45° C., and silver plated finish is 100/300 μin Cu/Ag;

Additional formulations were prepared to demonstrate the criticality of the metallic filler concentration. Table V lists the formulation, the curing conditions, the volume percent copper, the resulting average lap shear (in psi), the resulting average peel strength (in lbs/in.-width), and, in some cases, the log resistivity (ohm-cm), Table VI lists the formulation, the volume percent metal (copper) filler, the curing conditions, and the plating adhesion value (per modified ASTM D3359).

TABLE V

| Formulation | Vol. % Cu | Cure | Lap Shear (psi) | Peel Strength (lbs/in) | Log Resistivity (ohm-cm) |
|---|---|---|---|---|---|
| 0.8 g EPON 828, 0.3 g EPON 815, 0.4 g Heloxy 58005, 0.5% Silane A-187, 0.10 g TEPA, 0.12 g PACM, 4.0 g Cu (1–5μ) | 23.70 | 16–24 hrs RT, 1 hr 200° F., 1 hr 250° F. | 3741 ± 278 | 9.455 ± 1.038 | |
| 0.8 g EPON 828, 0.3 g EPON 815, 0.4 g Heloxy 58005, 0.5% Silane A-187, 0.10 g TEPA, 0.12 g PACM, 6.0 g Cu (1–5μ) | 31.90 | 16–24 hrs RT, 1 hr 200° F., 1 hr 250° F. | 2766 ± 157 | 9.268 ± 0.812 | |
| 0.7 g EPON 828, 0.4 g EPON 815, 0.4 g Heloxy 58005, 0.5% Silane A-187, 0.10 g TEPA, 0.12 g PACM, 5.0 g Cu (1–5μ) | 27.60 | 16–24 hrs RT, 1 hr 200° F., 1 hr 250° F. | 3317 ± 187 | 9.597 ± 0.448 | |
| 0.9 g EPON 828, 0.3 g EPON 815, 0.3 g Heloxy 58005, 0.5% Silane A-187, 0.10 g TEPA, 0.12 g PACM, 5.0 g Cu (1–5μ) | 27.60 | 16–24 hrs RT, 1 hr 200° F., 1 hr 250° F. | 2938 ± 215 | 3.197 ± 1.509 | |
| 0.8 g EPON 828, 0.4 g EPON 815, 0.3 g Heloxy 58005, 0.5% Silane A-187, 0.10 g TEPA, 0.12 g PACM, 5.0 g Cu (1–5μ) | 27.60 | 16–24 hrs RT, 1 hr 200° F., 1 hr 250° F. | 2886 ± 307 | 3.782 ± 0.652 | 9 |
| 0.8 g EPON 828, 0.35 g EPON 815, 0.35 g Heloxy 58005, 0.5% Silane A-187, 0.10 g TEPA, 0.12 g PACM, 5.0 g Cu (1–5μ) | 27.60 | 16–24 hrs RT, 1 hr 200° F., 1 hr 250° F. | 3207 ± 224 | 5.279 ± 0.967 | |
| 1.5 g EPON 828, 0.5% Silane A-187, 0.10 g TEPA, 0.12 g PACM, 7.5 g Cu (1–5μ) | 36.90 | 1 hr 200° F. 1 hr 250° F. | 2519 ± 228 | 1.788 ± 0.287 | 6 |
| 1.5 g EPON 828, 0.5% Silane A-187, 0.10 g TEPA, 0.12 g PACM, 9.0 g Cu (1–5μ) | 41.10 | 1 hr 200° F., 1 hr 250° F. | 2223 ± 71 | 1.118 ± 0.518 | |

Note:
lap shear and peel strength given as an average plus or minus one std. deviation (1σ variation).

TABLE VI

| Formulation | Vol. % Metal | Cure | Plating Adhesion (mod. ASTM D3359) |
|---|---|---|---|
| 0.75 g EPON 815, 0.75 g EPON 828, 0.18 g TEPA, 2.0 g Cu (1–5µ) | 12.50 | 2 days RT in air | 5 |
| 0.75 g EPON 815, 0.75 g EPON 828, 0.18 g TEPA | 0 | 2 days RT in air | 0 |
| 0.75 g EPON 815, 0.75 g EPON 828, 0.18 g TEPA, 0.4 g Ag (1–10µ) | 2.50 | 2 days RT in air | 0 |

Table V demonstrates that above about 35 vol % (the upper end of the filler concentration range), the distribution of peel strength produces too many undesirable low values (<1.5 lbs/in.-width). Similarly, the distribution of lap shear produces too many undesirable low values (<2,000 psi). Table VI demonstrates that below about 5 vol % (the lower end of the filler concentration range), the plating adhesion is poor and hence unacceptable.

Accordingly, it has been demonstrated that an adhesive formulated in accordance with the invention is successfully plated with metals after having been subjected to surface texturing.

INDUSTRIAL APPLICABILITY

The adhesives of the invention are expected to be successfully employed in industries involving the metal plating of custom formulated plastic parts. Particularly, the adhesives of the invention are expected to find utility in such industrial applications as the manufacture of automobiles, motorhomes, aircraft, boats, and manufactured homes.

Thus, there has been disclosed an adhesive for bonding cyanate ester composites together, with the adhesive capable of adhering to subsequently-plated metal after having been etched in a surface texturing process. Moreover, a method of formulating the present adhesive formulations is provided as well as a method for bonding cyanate ester composite articles with the present adhesives. It will be readily apparent to those of ordinary skill in this art that various changes and modifications of an obvious nature may be made without departing from the spirit of the invention, and all such changes and modifications are considered to fall within the scope of the invention, as defined by the appended claims.

What is claimed is:

1. A method for bonding cyanate ester composite articles to one another, said cyanate ester composite articles each having a surface, said method comprising:
   (a) preparing an adhesive according to steps comprising
      (i) providing a filler comprising powder or flakes of a metal and optionally, cyanate ester powder, said metal capable of being activated by an acid, said metal present in said adhesive in an amount (1) sufficient to provide said adhesive with a plating adhesion value of 5 as measured per ASTM D3359, as modified to a pressure sensitive test tape having an adhesion of 150 oz./in.-width, simultaneously with plating to a cyanate ester composite substrate and (2) not exceeding that at which said adhesive exhibits a distribution of peel strength with a mean less than two standard deviations above 1.5 lbs/in.-width as measured per ASTM D1876, and
      (ii) mixing said filler with a polymer mixture to form a thoroughly wetted mass, said polymer mixture comprising at least one polyepoxide resin and a substantially stoichiometric amount of the curing agent;
   (b) applying said adhesive to said surface of at least one of said cyanate ester composite articles to be bonded;
   (c) positioning said cyanate ester composite articles to form a mated assembly, said adhesive there between and in contact with said surface of each of said cyanate ester composite articles; and
   (d) allowing said adhesive to cure at a temperature less than 125° C., thereby bonding said cyanate ester composite articles to one another to form an assembly.

2. The method of claim 1 wherein said at least one polyepoxide resin is selected from the group consisting of diglycidyl ethers of Bisphenol A and diglycidyl ethers of Bisphenol F.

3. The method of claim 1 wherein said curing agent comprises at least one aliphatic polyamine and optionally further comprises at least one secondary curing agent selected from the group consisting of catalytic curing agents, cyloaliphatic diamines, aromatic amines, and anhydrides.

4. The method of claim 1 wherein said metal is selected from the group consisting of copper, silver, tin, brass, bronze, and gold, and mixtures thereof, and optionally further comprises a second metal selected from the group consisting of nickel and aluminum.

5. The method of claim 1, wherein the at least one polyepoxide resin comprises a diglycidyl ether of Bisphenol A.

6. The method of claim 1, wherein the at least one polyepoxide resin is selected from the group consisting of (a) mixture comprising 11% butyl glycidyl ether and 89% diglycidyl ether of Bisphenol A, (b) diglycidyl ether of Bisphenol A, and (c) a mixture comprising 60% diglycidyl ether of Bisphenol A and 40% of a carboxyl-terminated butadiene-acrylonitrile elastomer.

7. The method of claim 1, wherein the curing agent comprises at least one aliphatic polyamine.

8. The method of claim 7, wherein the at least one aliphatic polyamine is selected from the group consisting of triethylenetetramine and tetraethylenepentamine.

9. The method of claim 8, where the curing agent further comprises at least one secondary curing agent selected from the group consisting of catalytic curing agents, cycloaliphatic diamines, aromatic amines, and anhydrides.

10. The method of claim 1, wherein the metal is selected from the group consisting of copper, silver, tin, brass, bronze, and gold, and mixtures thereof.

11. The method of claim 10, wherein the metal further comprises a second metal selected from the group consisting of nickel and aluminum.

12. The method of claim 1, wherein the filler is present in said adhesive in an amount ranging from about 5 to about 30 volume %.

13. The method of claim 1, wherein the filler comprises copper, the polymer mixture comprises a diglycidyl ether of Bisphenol A, and the curing agent comprises tetraethylenepentamine.

* * * * *